April 1, 1941.  L. F. LITTWIN  2,236,624
TEMPERATURE CONTROL APPARATUS
Filed April 22, 1936  2 Sheets—Sheet 2

Inventor
Leo F. Littwin by Maxwell F. Cargill
Attorney.

Patented Apr. 1, 1941

2,236,624

UNITED STATES PATENT OFFICE 2,236,624

TEMPERATURE CONTROL APPARATUS

Leo F. Littwin, Chicago, Ill.

Application April 22, 1936, Serial No. 75,743

9 Claims. (Cl. 236—91)

This invention relates to improvements in control apparatus for heat transfer systems.

One object of the invention is to provide control apparatus which is fully automatic in operation and which can be adjusted to control the system in the desired manner under varying conditions. For example, the invention may be embodied in control apparatus for a heating system and can be adjusted to maintain the heating plant in operation during such times or at such intervals as may be necessary in maintaining the temperature of the building within pre-determined limits regardless of variations in external weather conditions. The apparatus may also be adjusted for effecting the operation of the plant within different temperature ranges as desired.

Another object of the invention is to provide electrical control apparatus comprising a bridge circuit and a grid controlled rectifying tube provided with a resistance in the bridge circuit for compensating for the effect on the operating characteristics of the tube of heat changes to which the tube is subjected and thereby stabilize the action of the tube which controls the flow of operating current to a heating plant motor, fuel control valve, or other equipment.

Another object of the invention is to provide control apparatus for a heating plant, which regulates the operation of the plant in accordance with the demand for heat but which can be adjusted to eliminate the supply of heat to the radiators, for example, but continue to maintain the operation of the plant to maintain service water at a suitable temperature.

A further object of the invention is to provide control apparatus comprising a bridge circuit the voltage of certain sections of the arms of which can be transferred to other sections for control purposes without unbalancing the bridge.

A further object of the invention is to provide control apparatus comprising an electrical bridge circuit adjustable for varying the operating and inoperative periods of the controlled equipment.

A further object of the invention is to provide heating plant control apparatus comprising a bridge circuit which can be so adjusted that the ratio of boiler water temperature to external temperature can be varied as may be found desirable with the particular heating equipment employed or the condition of the building to be heated.

Other objects relate to various features of construction and arrangement of parts which will be apparent from a consideration of the following specification and accompanying drawings, wherein.

Figure 1:
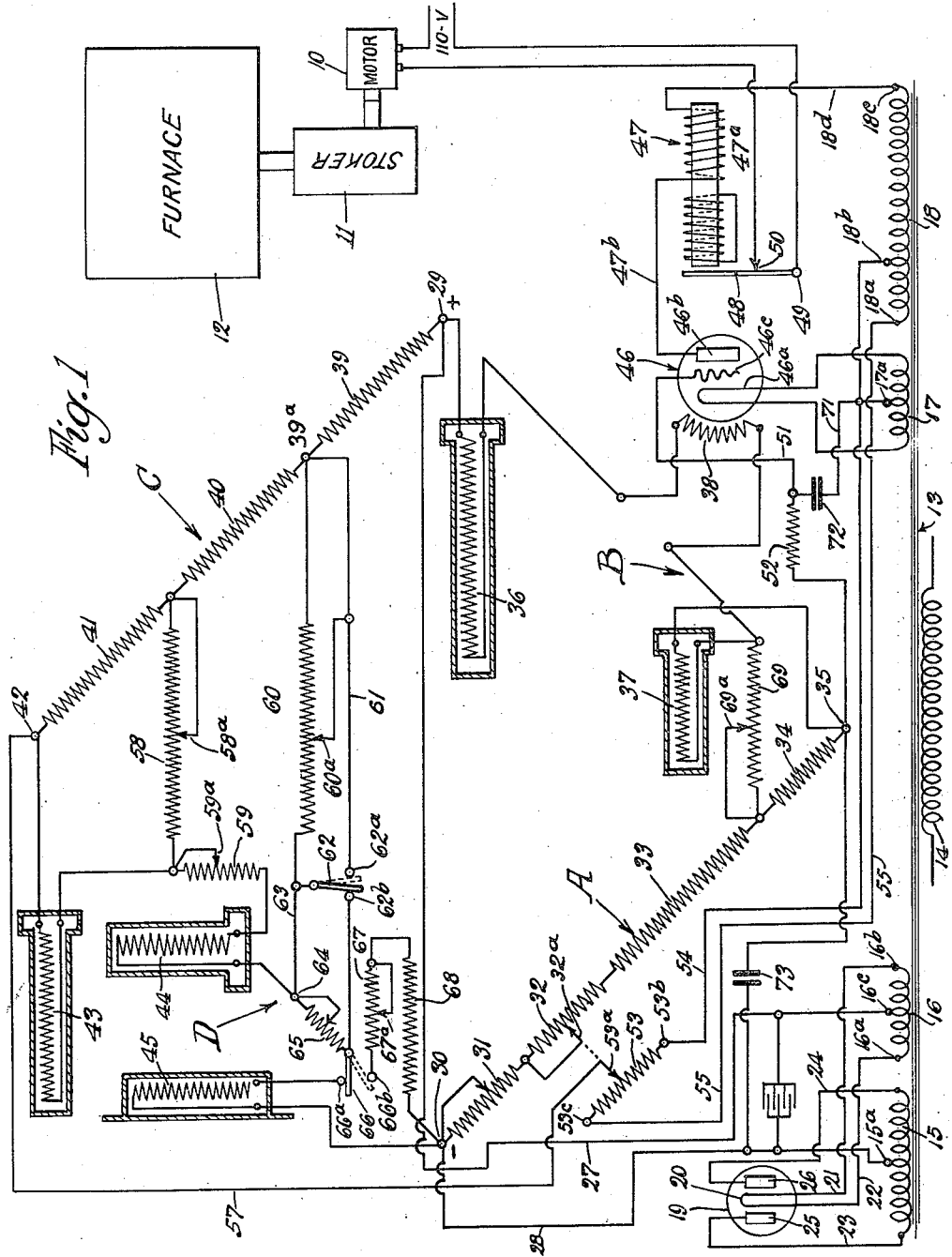
Figure 1 is a diagrammatic representation of a control apparatus embodying the invention.

In the drawings a motor 10 is illustrated which may be employed for operating a mechanical stoker 11 which supplies fuel to a furnace 12, the furnace providing heat to the building the temperature in which is to be regulated by the control apparatus. It will be obvious that the device to be controlled may likewise be a gas valve, where gas heat is employed, or a motor for liquid fuel heating apparatus or a motor for a condenser of a refrigerating system, or other operating or regulating means for other heat transfer systems.

The apparatus operates electrically, the current being supplied from any suitable source as by a transformer 13, where A. C. current is available. The transformer has a primary winding 14 and a number of secondary windings 15, 16, 17 and 18 which supply current of the necessary voltage to the apparatus which includes a bridge comprising four arms indicated generally by the letters A, B, C, and D. A full wave rectifying tube 19 is employed for impressing direct control voltage on the bridge, the tube 19 having its filament 20 connected by leads 21 and 22 to terminals 16a, 16b of the winding 16. The winding 15 supplies A. C. current through leads 23 and 24 to the plates 25 and 26 respectively. Conductors 27 and 28, the former extending from a central terminal 16c of the secondary winding 16 and the latter extending from central terminal 15a of the secondary winding 15, to bridge terminals 29 and 30 respectively, supply direct current to the bridge.

The arm A of the bridge comprises a number of resistors connected in series and indicated by the numerals 31 (which is an adjustable bridge balancing resistor), 32, 33 and 34, and extend between a terminal 30 and a terminal 35.

Arm B of the bridge includes heat sensitive elements 36, 37 and 38, for example. The arm B extends between terminals 29 and 35.

Arm C of the bridge comprises resistors 39, 40 and 41 and extends between terminals 29 and a terminal 42.

Arm D of the bridge, in the form illustrated, includes heat sensitive elements 43, 44 and 45 and are connected to terminals 30 and 42.

A mercury vapor or other suitable grid controlled rectifying tube 46, which is sufficiently sensitive to small voltage changes on the grid, and comprising a filament 46a, plate 46b and grid 46c is employed for supplying current to the apparatus to be controlled, as to a relay 47 of the apparatus which when energized by current passed by the tube moves an armature 48 to close the circuit between contacts 49 and 50 to supply current to the motor 10 for operating the stoker 11, to supply fuel to the furnace 12, which in turn supplies heat to the building, the temperature of which is to be controlled by the apparatus. The temperature responsive elements 36, 37, 43, 44 and 45 have resistances, the resistance of each of which increases with rise in temperature. These temperature responsive elements are of a type well known in the art.

Element 36 is inserted in the boiler beneath the level of the water therein while element 37 is located in the cold water return line, it being assumed that steam or hot water heating equipment is being employed in the installation to be described.

One or both elements 43 and 44 are located on the outside of the building in different locations where they will be exposed to wind and external temperature changes, while element 45 may be located in the room or portion of the building most difficult to heat.

As stated, the tube 19 supplies direct current of the proper voltage (300 volts, for example, having been found satisfactory) to terminals 29 and 30 of the bridge, terminal 29 being the positive side and terminal 30 the negative. If the bridge is in electrical balance there will be no potential difference between terminals 35 and 42. The terminal 35 of the bridge is connected by conductor 51 with the grid 46c of tube 46, there being a blocking resistor 52 inserted in the conductor.

A variable resistor 53 is connected by conductors 54 and 55 to taps 18a, 18b respectively of the winding 18, the conductor 54 being also connected to a central tap 17a of the winding 17. An adjustable contact arm 53a of resistor 53 is connected to conductor 57 which extends to the terminal 42.

A conductor 18d leads from the terminal 18c of winding 18 to the winding 47a of the relay 47, and the opposite end of the winding 47a is connected to the plate 46b of the tube by conductor 47b. The effect of connecting the resistor 53 to taps 18a, 18b is to impose an A. C. energizing potential on the bridge and from the bridge through conductor 51 to the grid 46c. This A. C. potential of the grid is of a phase angle opposite the phase angle of the plate 46b impressed thereon through conductor 18d, winding 47a and conductor 47b from the secondary 18.

With contact arm 53a adjusted to the position shown in Figure 1, to impose a suitable A. C. potential on the grid, say of 5 volts, it will, under given temperature conditions of the heat sensitive resistors, prevent the passage of current from the filament to the plate, and thus hold the motor circuit open. With the tube thus inoperative to pass current it will be seen that increasing resistance in the leg D of the bridge (which increases the potential difference between terminals 42 and 35) imposes D. C. potential through conductor 57, resistor 53, conductor 54 to the center tap 17a of the filament winding 17, and renders the filament 46a more positive with respect to the negative potential on the grid, and the tube thus still remains inoperative to pass current to the plate. Should the resistance of arm D of the bridge be decreased sufficiently instead of increased, the relative potential at terminals 42 and 35 is altered, that is, the potential at terminal 35 is increased with reference to the potential at 42 and a positive D. C. potential from terminal 35 through conductor 51 is impressed on the grid which tends to upset the balance of the tube to enable it to pass current to the relay 47, and thus start the motor 10. This result occurs when the temperature lowers sufficiently to which the thermo-sensitive elements 43, 44 and 45 are exposed. Should the resistance of arm B of the bridge be increased, as by the increase in temperature conditions surrounding elements 36, 37, it increases the negative potential of terminal 35, with respect to terminal 42, thus impressing negative voltage on the grid and rendering the tube inoperative or holding it so. Lowering the resistance in arm B of the bridge as by the cooling of the water in the boiler or in the boiler water return line, increases the positive potential at terminal 35 with respect to 42 and imposes a positive potential on the grid which permits current to pass from the filament 46a to the plate 46b. It will thus be seen that varying the resistance of either arm B or D may effect operation of the tube or render it inoperative, depending on whether such resistances are increased or decreased.

In Figure 1 the contact arm 53a may be assumed to be set so as to impose from resistor 53 a 5 volt A. C. potential on the bridge and through the bridge and wire 51 to the grid. Should the contact 53a be moved over to terminal 53b, there will be no A. C. potential difference between the filament and the grid due to the fact that conductor 54 is tapped at the center of the filament winding 17, and the tube would tend to pass current. Slidable contact arm 32a preferably is arranged to operate simultaneously with contact arm 53a so that as the latter is moved toward terminal 53b, the resistance of resistor 32 is decreased. This adjustment increases the negative potential at the terminal 35 and imposes a 5 volt D. C. negative potential from the bridge through conductor 51 to the grid which tends to hold the tube in the same relative operating condition. With the contact 53a set as just described, and the tube being held inoperative by negative D. C. potential on the grid, it requires less variation in resistance in the bridge arms B or D to throw the tube from operative to inoperative condition and vice versa. Therefore relatively slight change in temperature to which the temperature responsive elements are exposed, will effect or tend to effect the operation of the tube, and the adjustment of the bridge circuit is, therefore, most sensitive when the arm 53a is adjusted as far as possible toward terminal 53b and a short running period of the heating apparatus is effected. By shifting the arm 53a in the opposite direction or toward the terminal 53c of the resistor 53, and moving contact 32a also in the opposite direction to increase the resistance of the arm A, a longer running or operating period and a longer shut down period will be effected. The variable resistor 53, therefore, can be set as desired to vary the differential or the on and off periods of operation of the heating apparatus.

Referring to arm D of the bridge, element 43 is of the same resistance as resistor 41, element 44 the same as resistor 40, and element 45 the same as resistor 39. The variable shunt resistor 58 is for varying the ratio of the resistance of element 43 with respect to element 36. If the contact 58a is moved to the extreme right, the increase in resistance of element 58 increases the potential in resistor 41 and element 43, whereby the lowering of the resistance of element 43 by a lowering of the temperature effects a greater voltage change at terminal 42 with respect to terminal 35, with the result that element 36 must change compensatorily to bring the bridge back to balance. Thus a predetermined drop in outside temperature affecting element 43 will unbalance the bridge and set the heating apparatus into operation but increase in boiler water temperature of a predetermined and related degree around element 36 (which increases its resistance) will be necessary to re-establish the bridge balance and stop the operation of the heating apparatus. Further drop in outside temperature may again start the heating apparatus and in case of a continuous drop in outside temperature the heating apparatus may remain in operation until the temperature of the boiler water has increased to a predetermined degree. Thus, for example, a drop in outside temperature of 5° may result in placing the heating apparatus in operation until the boiler water has been increased 1° F. By moving the contact 58a to the left, the temperature ratio may be varied, that is, the adjustment may be made so that a 10° drop in outside temperature will effect the raising of the boiler water 1°, or other greater or less ratios may be selected.

Element 44 which may be eliminated if desired, is when employed, placed outside the building also, say on the side of the prevailing wind on the side of the building opposite element 43. Increasing the resistance in resistor 58 raises the potential in element 43 and lowers the potential in elements 44 and 45, the latter being inside the building.

Variable shunt resistor 60, having adjustable contact arm 60a is provided for altering the ratio of elements 43, 44 and 45, with respect to element 36. By moving arm 60a to the right, increased potential is transferred to elements 43 and 44, but decreased in element 45, thus rendering elements 43 and 44 more sensitive to temperature changes with respect to element 36, and rendering element 45 relatively less sensitive with respect to element 36. By moving arm 60a to the left, elements 43 and 44 are rendered less sensitive and element 45 more sensitive with respect to member 36.

Varying the sensitivity of elements of arm D, however, as described, does not unbalance the bridge by creating a potential difference between terminals 35 and 42. This results from the fact that as voltage is reduced or eliminated from element 43 of arm D, voltage is also equally reduced or eliminated from section 41 of arm C of the bridge. In making such adjustment the total voltage of each arm C and D of the bridge is not changed but merely transferred to the remaining operative sections 39 and 40 of arm C and to elements 44 and 45 of arm D. The bridge likewise remains in relative balance upon making adjustments of arm 60a of resistor 60, since upon moving arm 60a to the extreme left the total voltage of arm C is transferred to section 39 and the total voltage of arm D is transferred to element 45, the voltages of the two arms remaining relatively unchanged and the bridge consequently remaining in relative balance. By this arrangement it will be seen that the bridge remains in relative balance upon adjusting arms 58a or 60a, for varying the ratio of elements 43, 44 and 45 with respect to element 36.

In further explanation generally of the operation of the bridge, let it be assumed that the bridge is in operative balance, so that the tube 46 is not passing current to the relay 47, and the motor 10 is inoperative. A sudden drop in temperature affecting elements 43 and 44 reduces the resistance of arm D of the bridge, tending to unbalance it and effect the operation of the motor. This will be true even though the inside temperature affecting element 45 is unchanged. If the drop in outside temperature is, say, 5°, the boiler water may heat up say 1° or until the increased resistance of element 36 restores the balance of the bridge. A reserve supply of heat in the heating system is thus immediately built up against the lowering of the temperature in the building. If the lower outside temperature penetrates the building, affecting element 45, the bridge remains unbalanced, the tube passing current, and the heating system remains in operation until the bridge is balanced by predetermined increase in boiler water temperature affecting element 36. It will be seen that if the outside temperature continues to drop, the inside temperature may be raised to the predetermined degree, say to 68 or 70°, and due to the lower outside temperature the heating apparatus may continue to operate until the temperature of the boiler water is such as to effect the balancing of the bridge by means of element 36. As the boiler water cools off the bridge will again tend to become unbalanced, (the outside temperature remaining constant or lowering) and upon cooling of the water an extent determined by the adjustment of arm 53a, the motor will be thrown again into operation. Thus with the temperature inside remaining at 68°, for example, and a lower outside temperature, the motor 10 may operate continuously or intermittently, depending on the demand for heat.

Assume that arm 53a is set at 1° operating differential and outside elements 43 and 44 are adjusted by means of arm 60a to establish a 5 to 1 temperature ratio with respect to element 36. A drop of outside temperature of 5° will unbalance the bridge and start the motor and keep it operating until the boiler water temperature is increased 1° or until the increased resistance of element 36 restores the bridge balance. The heating plant is thus placed in operation immediately or before the lower outside temperature has been able to penetrate the building. A short running time as well as a short shut down period is thus established by so adjusting arm 53a.

If the arm 53a is set at a 5° operating differential (or toward terminal 53c) the temperature ratio of outside elements 43 and 44 with respect to element 36 remaining set at 5 to 1, and the outside temperature should drop 5°, the bridge will not be thrown sufficiently out of balance to start the heating plant, since by such adjustment of arm 53a a greater potential difference in the terminals 35 and 42 will be required to enable the tube to pass current. For example, with arm 53a set at a 1° operating differential, a potential difference of $\frac{1}{16}$ volt at terminals 35 and 42 will throw the tube into operation, while with a 5° operating differential, a .5 volt potential difference on the terminals is required to operate the tube.

For example, with a 5° operating differential setting of arm 53a, the outside temperature would have to drop 25° before the plant starts operating if the boiler water temperature remains constant and the plant will continue operating until the boiler water temperature is increased 5°. Since a drop in outside temperature will ordinarily soon affect the inside temperature and also the boiler water temperature, the plant will begin operating ordinarily before the outside temperature has dropped 25° as stated above, and consequently the heat will be supplied to the building to prevent undesirable fluctuations of inside temperature. It will thus be seen that by adjusting the arm 53a as stated, longer operating and shut down periods are provided and that the improved control responds not only on outside temperature changes but to correlated inside conditions also.

During the night it is the general practice in some buildings to permit the inside temperature to drop a few degrees, and in order to adapt the present control apparatus to carry out this practice, a shunt conductor 61 is provided which extends from terminal 39a to a contact 62a of a switch arm 62. A second switch contact 62b is provided which is shown in contact with switch arm 62. When the arm 62 is in contact with contact 62a the elements 43 and 44 will be shunted from arm D of the bridge, by means of conductor 61, switch arm 62, and conductor 63 (extending from the switch arm 62 to the contact 64), thus placing resistor 65 in series with element 45. All the voltage of arm D is thus transferred to element 45 and resistor 65 and the voltage of arm C is transferred to section 39 thereof. Adding the variable resistor 65 to arm D of the bridge will increase the positive D. C. potential at terminal 42 and cause the plant to be inoperative until the temperature of the boiler water drops to the predetermined degree established by the adjustment of resistor 65 or until the room temperature drops to compensate for the resistance added to arm D by the resistor 65. Thus the plant is under the control of the inside temperature only while the elements 43 and 44 are shunted from arm D, as described.

In those seasons when the outside temperature rises to the point where no heat is required in the building, the present control is arranged to cut off the supply of heat to the radiators but to maintain the service water at the desired temperature. The variable resistor 59 has an adjustable arm 59a which is adapted to vary the total resistance of arm D of the bridge. Thus if arm 59a is moved downwardly from the position shown in Figure 1, the resistance of the arm is decreased and if moved upwardly the resistance is increased. Assume that the adjustment of the control is such that when contact arm 59a is in the central position shown, the heat to the radiator will be terminated at 60° outside temperature and the inside temperature affecting element 45 is at a predetermined temperature. As the water cools, the resistance of element 36 decreases, thus decreasing the negative potential at terminal 35 and on the grid, which effects the closing of the relay 47 and starts the motor. As the heat of the water increases, the resistance of element 36 increases, thus increasing the negative potential on the grid and stopping the motor before the boiler water temperature is sufficiently high to deliver heat to the radiators, provided, of course, the outside temperature remains above 60° and the room temperature is at or above the predetermined point. This arrangement, therefore, supplies sufficient heat for the service water without supplying heat to the radiators.

Moving arm 59a downwardly decreases the total resistance of arm D of the bridge which will permit the outside temperature to rise to a higher point before the supply of heat to the radiators is terminated, and conversely raising resistor arm 59a will increase the total resistance of arm D and effect the cutting off of steam to the radiators at a lower outside temperature.

During seasons of the year when heat is required generally from day to day with occasional periods when no heat is required for the building, the arm 59a remains in the position for maintaining the fire in the furnace and supplying heated service water. Should the arm 59a, for example, be set to interrupt the supply of heat to the radiators when the outside temperature has risen to 60° F. and the outside temperature should drop below that point, as to 50°, the resistance of arm D will be decreased and effect a decrease of negative potential on the grid and start the motor which will continue to operate until the temperature of the boiler water increases the resistance of element 36 sufficiently to compensate for the decrease in resistance of arm D, but heat will in the meantime have been supplied to the radiators.

In those seasons when the temperature is sufficiently high so that no heat is required for the building, it is generally desirable to maintain the service water at a suitable temperature irrespective of variations of outside temperature. To provide for the maintenance of heated service water under such conditions, switch arm 62 is moved into contact with terminal 62a and switch arm 66 moved from contact 66a into contact with terminal 66b which shunts out resistors 40, 41, 58, 60 and elements 43, 44 and 45 from the bridge circuits, although they remain as potential carrying conductors. Resistor 39 then constitutes arm C of the bridge, and resistors 65, 67 and 68 arm D, the two arms being connected by conductor 61. The switch arms 62 and 66 preferably are connected together so as to be operated simultaneously as by knobs 62x, 66x of Figure 2. Resistor 67 is adjustable for controlling the temperature of the boiler water which in turn usually heats the service water. By moving adjustable arm 67a to the right, the resistance of arm D is increased, thus increasing the negative potential at the grid and thus holding the motor inoperative until the boiler water temperature has decreased to a predetermined degree at which point the decreased resistance of element 36 will cause the motor to be again operated. By moving the arm 67a to the left, the resistance of the arm D is decreased with the result that the boiler water is maintained at a higher temperature.

Arm B of the bridge, as stated above, in addition to element 36 preferably contains elements 37 and 38. Element 37 is placed on the boiler water return line and while its use is optional in installations where element 45 is employed, it has distinct advantages in controlling the operation of the heating system and hence is included in the illustrated control device for the purpose of completeness of description. Element 37 is a heat responsive member of the character of elements 36, 43, 44 and 45 and as it is heated by the return water, its electrical resistance increases.

In most buildings the heat to the radiators is shut off during the night and only hot service water provided for the occupants. Where the present control is to be thus employed, the janitor operates switches 62 and 66 from the positions shown in Figure 1 (by means of knobs 62x, 66x of Fig. 2) to that above described with respect to maintaining hot service water. In the morning he reverses the position of the switches, or if desired, time switches may be employed for this purpose. The return water will, of course, be cold when the heating system is placed in operation in the early morning and hence the resistance of element 37 will be sufficiently low to allow element 36 to permit the boiler water temperature to be raised to a higher temperature than under ordinary operation. This arrangement assures a relatively quick supply of heat in the early morning. As the return water gradually starts heating, the resistance of element 37 gradually increases, thus increasing the total resistance of arm B of the bridge, thereby resulting in the gradual lowering of the temperature of the boiler water until the return water reaches the maximum temperature from which time the system operates either continuously or intermittently in accordance with the demand for heat.

Suppose a building requires 3 pounds of constant steam pressure to maintain an inside temperature of 70° F. at 0° F. outside temperature. In that case the arm 60a will be set on the dial (see Fig. 2) for 6 pounds of steam. Arm 69a of resistor 69 will be set at 9° reaction from the return line. When the return water is cold at the start of the heating in the morning, the boiler will freely build up a pressure of 6 pounds of steam until the return water begins to heat, at which time it will start decreasing the steam pressure until the return water reaches the maximum temperature of 200° F., which will reduce the boiler temperature 9° F. or to 3 pounds of steam, at which point the system will continue to operate so long as the outside and inside temperatures and the temperature of the return line remain the same.

By setting arm 69a to the left from the position shown it will permit element 37 to effect a greater reaction on element 36 and thus effect a greater reduction of boiler water temperature at a given temperature of the boiler return water. By moving the arm 69a to the right, the element 37 will have a smaller reaction on element 36.

The element 38 is a compensating resistance and consists of a suitable number of turns or windings of heat sensitive wire placed on or adjacent the tube 46. This element compensates for temperature changes in and around the tube. As the temperature to which the tube is subjected varies, the resistance of element 38 changes, that is, it increases with rise of temperature and decreases with the reduction in temperature. It is a characteristic of this type tube that the tube requires less negative bias on the grid to keep it inoperative, i. e. to prevent passing current to the plate, when the tube is cool than when it is at a higher temperature. It will, therefore, be seen that at a given low temperature of the tube, and the accompanying reduction in the resistance of the coil 38, less negative potential will be imposed on the grid by a given potential difference as between terminals 35 and 42 than when the tube is warmer. Hence the element 38 which warms up with the tube, either from heat emitted by the tube or by heat from an adjacent or surrounding source, to which the tube is subjected, decreases or increases the total resistance of arm B of the bridge in accordance with variations of tube temperature and hence retains the grid bias at its critical operating point. By this arrangement functioning of the tube is stabilized through different temperature changes.

For the purpose of holding the operation of the tube 46 less erratic from disturbances in the control voltage of the bridge, a conductor 71 is connected from the center tap 17a of winding 17 and leads to a condenser 72 which is connected to the conductor 51, as shown in Figure 1. Thus a surge of current in the bridge toward the grid of the tube will be blocked partially by the blocking resistor 52, and as it bleeds through the resistor it discharges into the condenser 72 without materially interfering with the smooth functioning of the tube. The condenser 72 also fixes the phase angle as between the grid and the plate of the tube which angle can be altered only by adjustment of the arm 53a.

A condenser 73 preferably is connected between the negative voltage supply conductor 28 and terminal 35 to balance out the capacity of element 36 in the arm B of the bridge for the purpose of eliminating fluctuations of potential in the grid imposed from any outside source. The condenser also by-passes to the negative supply line 28 positive voltage induced in the compensating element 38 by the tube 46.

Figure 2:
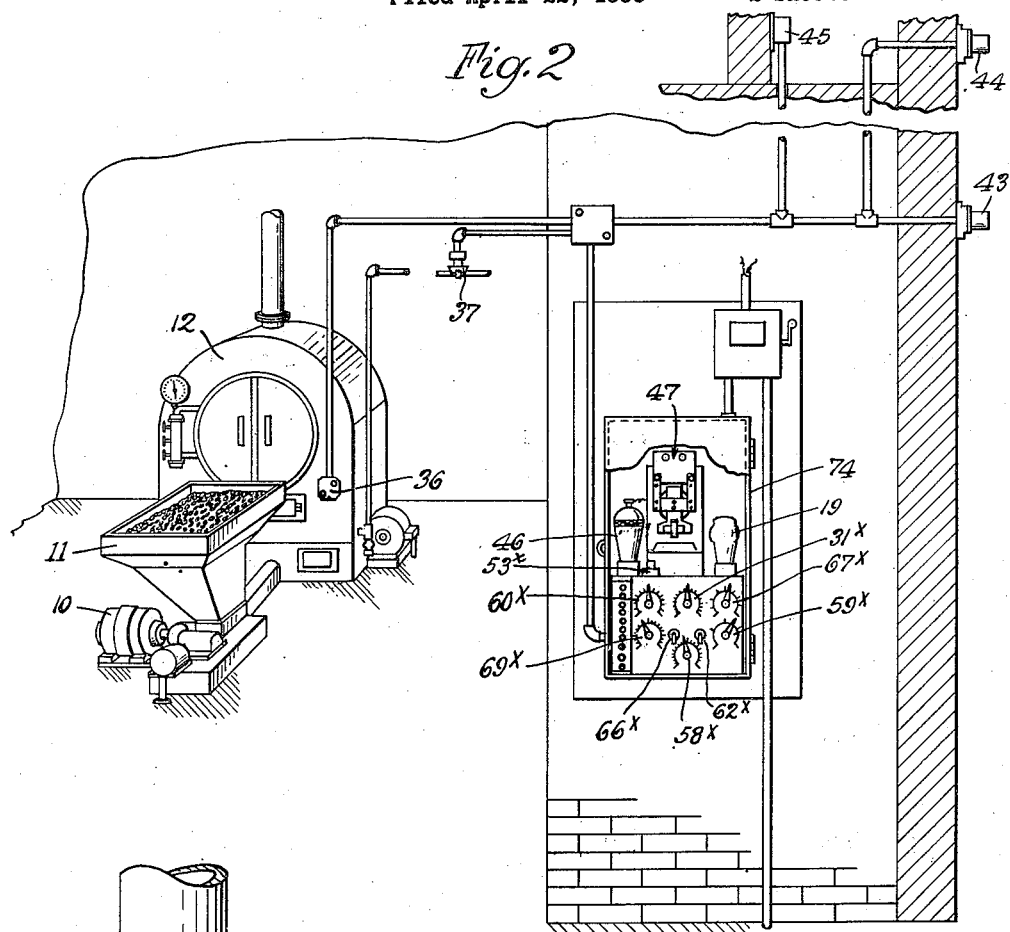
Figure 2 is a perspective view illustrating an installation of the improved control apparatus.

In Figure 2 of the drawings which discloses an installation of the improved control apparatus, a casing 74 is shown which houses certain of the fixed and adjustable bridge resistors, switches, condensers and other elements of the apparatus. The casing also contains a panel upon which are mounted various knobs, calibrated dials and switch arms for making the various adjustments above described. Thus member 53x is the manual operating member for effecting the adjustment of arm 53a of resistor 53. The other adjusting members are designated by numerals carrying the exponent x which control the adjustment of the members designated in Figure 1 and in the specification by similar reference numerals but without the exponent.

Figure 3:
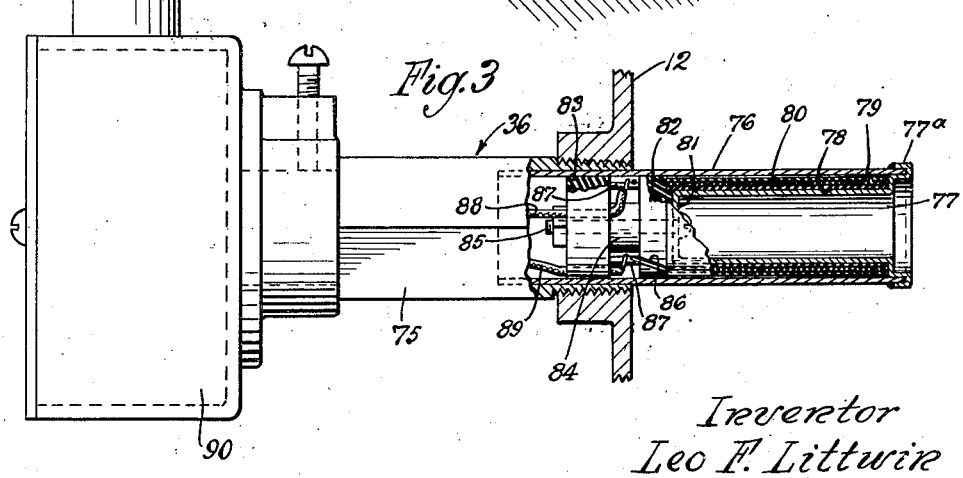
Figure 3 is a broken side elevation of a thermo-sensitive boiler unit.

In Figure 3 of the drawings, which is an enlarged broken elevation of the boiler control unit 36, 12 indicates a portion of the boiler wall having a threaded opening which receives the threaded end of a tube 75 extending into the boiler, and soldered or otherwise secured to the inside of the tube 75 is a thin tube 76, the inwardly projecting end of which extends into an annular channel formed by turning back the end 77a of an inner tube 77. The inner tube 77 has one or more layers or insulations 78 therein over which is wound the resistance wire 79, one layer only being shown in the drawings, although in actual installation several separated and insulated layers are generally employed. An exterior layer or insulation 80 covers the exterior winding.

The bottom or inner end of the tube 77 is closed by a disk-shaped member 81. The result of this arrangement is that the boiler water affects not only the tube 76, but the tube 77 as well, thus subjecting the winding 79 to a temperature more precisely corresponding to the boiler water temperature than would be the case if the water did not have access to the interior of the unit.

A pair of insulating washers 82 and 83 are located in the tube 76 and spaced apart by means of a spacing insulator 84, through all three of which extends a threaded bolt 85 which secures the insulators 82 and 83 to the base 81 of the tube 77. The ends of the winding 78 are passed through kerfs 86 in the insulating plug 82 and each soldered to one of the two or more pins 87 held in position between the members 82 and 83 by having opposite ends disposed in openings bored in said members 82 and 83.

Lead-out conductors 88 and 89 have their ends soldered to the pins 87 and pass out through the tube 75 to the conventional conduit box 90 for connection in the bridge circuit as above described.

The head of the bolt 85 is soldered to the base 81 of the tube 77 to prevent leakage of boiler water through the unit. This unit has been found very satisfactory in use and due to the fact that the thermo-sensitive winding 79 is subjected to the temperature of the water from the inside as well as from the outside, it responds quickly to changes in boiler water temperature which is, of course, desirable in a control system of this character.

While I have shown and described an embodiment of my improvements for the purpose of illustration, I do not wish to be restricted specifically thereto except as so limited by the appended claims.

I claim:

1. Control apparatus comprising a grid-controlled tube adapted to pass current to a device to be controlled, a bridge circuit having thermo-sensitive potential carrying resistance elements in opposed arms thereof adapted to be subjected to temperature changes of different media for controlling the application of tube operating potentials on the grid in accordance with predetermined temperature changes of said media, and means for varying the relative potentials of certain of said elements while maintaining the same relative balance of the bridge circuit.

2. Control apparatus comprising a bridge circuit having cooperating thermo-sensitive potential carrying resistors in two opposed arms thereof for controlling the potential on a pair of terminals electrically connected in said circuit in accordance with the temperature of media to which said resistors are subjected, and means comprising a variable resistor connecting said two arms of the bridge for varying the potentials of certain of said resistors while maintaining the relative balance of the bridge for effecting the application of an operating potential difference on said terminals under different temperature ranges affecting said resistors.

3. Control apparatus comprising a bridge circuit having cooperative thermo-sensitive potentials carrying resistors in an arm thereof, and variable resistances coupling said arm with an adjacent arm of the bridge for varying the potential of certain of said thermo-sensitive resistors and maintaining the relative balance of the bridge circuit.

4. Control apparatus comprising a bridge circuit, a grid controlled tube in said circuit adapted to pass current under control of the bridge to means to be actuated, means for supplying an A. C. energizing potential to said bridge circuit and tube, means for supplying D. C. control potential thereto, and cooperating heat sensitive resistors subjected to temperatures of different media connected in two opposed arms of said bridge for varying the D. C. control potential on the tube grid for rendering the tube operative to pass current under predetermined temperature conditions affecting said resistors and effecting the operative balance of the bridge circuit to render the tube inoperable within certain ranges of temperature affecting said resistors.

5. Control apparatus comprising a bridge circuit, a grid controlled tube in said circuit adapted to pass current under control of the bridge to means to be actuated, means for supplying an A. C. energizing potential to said bridge, means for supplying D. C. control potential thereto, heat sensitive resistors subjected to temperatures of different media and connected in two opposed arms of said bridge circuit for effecting the operative balance of the bridge within predetermined temperature ranges affecting said resistors, and means for varying the A. C. potential on the bridge for establishing the balance of the bridge and inoperability of the tube under different ranges of temperature affecting said resistors.

6. Control apparatus for a heating plant having a boiler comprising a bridge circuit, a grid-controlled tube connected to the circuit for passing current under control of the bridge to a supply means, means for supplying control potential to the bridge, a resistor in one arm thereof adapted to be subjected to external temperature conditions, a second resistor in an opposed arm of the bridge adapted to be subjected to boiler water temperature, a third resistor in said last mentioned arm subjected to temperature of boiler return water, said resistors being of the type which increase in electrical resistance with increase in temperature, the value of the resistances of the respective arms of the bridge being such as to effect the balancing of the bridge when subjected to predetermined temperature conditions and to upset the bridge balance and cause the tube to pass current upon the lowering of temperature affecting any or all the resistors below a predetermined degree.

7. Control apparatus comprising a heating plant having a boiler comprising a bridge circuit, a grid controlled tube connected to the circuit for passing current under control of the bridge when the bridge is operatively unbalanced to fuel supply means, means in said circuit tending to unbalance the bridge to effect passing of current by the tube upon lowering of temperature in different media affecting said means, and means comprising a thermo-sensitive resistor in one arm of the bridge subjected to the temperature of boiler water, and a thermo-sensitive resistor in an opposed arm of the bridge subjected to atmospheric temperature, and a third thermo-sensitive resistor connected in the last mentioned arm of the bridge and subjected to the temperature of boiler return water for influencing the balancing or unbalancing tendency of said first and second resistors in accordance with the relative temperature of the boiler return water with respect to the boiler water.

8. Control apparatus comprising a grid controlled tube for controlling the flow of actuating current to a device to be operated, a bridge circuit having thermo-sensitive resistors in opposed arms thereof subjected to temperature changes of different media for imposing operating potential on the grid of said tube upon the unbalancing of the bridge due to predetermined temperature changes in said media, and a thermo-sensitive resistor subjected to temperature changes in and around said tube and connected in one of said arms of the bridge for varying the control potential applied to the grid to compensate for varying current passing characteristics of the tube during temperature changes to which the tube is subjected.

9. Control apparatus comprising a grid controlled tube for controlling the flow of actuating current to a device to be operated, a bridge circuit for imposing operating potential on the grid of said tube, means in said bridge circuit for controlling the imposition of potential on said grid in accordance with predetermined temperature changes affecting said means, and an element connected in the bridge circuit and subjected to temperature changes affecting the current passing characteristics of the tube for modifying the control potential of the grid to compensate for said temperature changes affecting the current passing characteristics of the tube.

LEO F. LITTWIN.